United States Patent
Getzin et al.

(10) Patent No.: US 7,643,950 B1
(45) Date of Patent: Jan. 5, 2010

(54) SYSTEM AND METHOD FOR MINIMIZING POWER CONSUMPTION FOR AN OBJECT SENSOR

(75) Inventors: Lawrence Getzin, Columbia Heights, MN (US); Richard B. Nelson, Chandler, AZ (US); Jaswinder S. Jandu, Chandler, AZ (US); Richard Alexander Erhart, Tempe, AZ (US)

(73) Assignees: National Semiconductor Corporation, Santa Clara, CA (US); Validity Sensors, Inc., Phoenix, AZ (US)

( * ) Notice: Subject to any disclaimer, the term of this patent is extended or adjusted under 35 U.S.C. 154(b) by 0 days.

(21) Appl. No.: 11/291,639

(22) Filed: Dec. 1, 2005

(51) Int. Cl.
*G01R 21/00* (2006.01)
*G01R 21/06* (2006.01)
*G06K 9/00* (2006.01)
*G06T 1/00* (2006.01)
*G06T 7/00* (2006.01)

(52) U.S. Cl. ............... 702/60; 340/5.53; 340/5.83; 702/168

(58) Field of Classification Search ........... 702/19, 702/60, 168; 340/5.53, 5.83
See application file for complete search history.

(56) References Cited

U.S. PATENT DOCUMENTS

| | | | | |
|---|---|---|---|---|
| 5,781,651 A | * | 7/1998 | Hsiao et al. | 382/127 |
| 5,801,681 A | * | 9/1998 | Sayag | 345/157 |
| 6,052,475 A | * | 4/2000 | Upton | 382/125 |
| 6,098,175 A | * | 8/2000 | Lee | 713/320 |
| 6,766,040 B1 | * | 7/2004 | Catalano et al. | 382/115 |
| 6,886,104 B1 | * | 4/2005 | McClurg et al. | 713/300 |
| 2002/0126516 A1 | * | 9/2002 | Jeon | 363/67 |
| 2003/0141959 A1 | * | 7/2003 | Keogh et al. | 340/5.53 |
| 2006/0214512 A1 | * | 9/2006 | Iwata | 307/44 |

FOREIGN PATENT DOCUMENTS

EP 1 289 239 A2 * 5/2003
JP 2006-271028 * 3/2005

* cited by examiner

*Primary Examiner*—Aditya Bhat

(57) ABSTRACT

A system and method is disclosed for minimizing power consumption of a sensor unit that is capable of detecting an object. Main circuitry operates the sensor unit in a high power mode of operation when the sensor unit detects an object. Low power control circuitry operates the sensor unit in a low power mode of operation when the sensor unit does not detect an object within a pre-determined period of time. The low power control circuitry also comprises a counter to periodically determine when to restore the sensor unit to a high power mode of operation. One advantageous embodiment of the sensor unit is a fingerprint sensor unit for detecting a finger to obtain fingerprint information.

20 Claims, 3 Drawing Sheets

SYSTEM AND METHOD FOR MINIMIZING POWER CONSUMPTION FOR AN OBJECT SENSOR

TECHNICAL FIELD OF THE INVENTION

The present invention is generally directed to technology for object sensors and, in particular, to circuitry for providing low power consumption for an object sensor.

BACKGROUND OF THE INVENTION

An electronic sensor unit is required to remain operational during the time that the sensor unit is waiting to receive an object to sense. For example, consider a sensor unit that is designed to sense the presence of a finger and obtain fingerprint information from the finger. When a person places a finger on the sensing site of the sensor unit, the sensor unit must be operational in order to perform the sensing function. This means that the sensor unit must continually remain in operational mode.

However, continually remaining in an operational mode requires a needless expenditure of power when there is no object present for the sensor unit to detect. Because a sensor unit may be used in a battery operated system for extended periods of time, it would be very advantageous if the power consumption of the sensor unit could be minimized.

Therefore, it would be advantageous to have a system and method for minimizing power consumption in an electronic sensor unit. It would also be advantageous to have a system and method that is capable of operating an electronic sensor unit in a power conservation mode (i.e., a "low power" mode) when no object is present for the sensor unit to detect.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
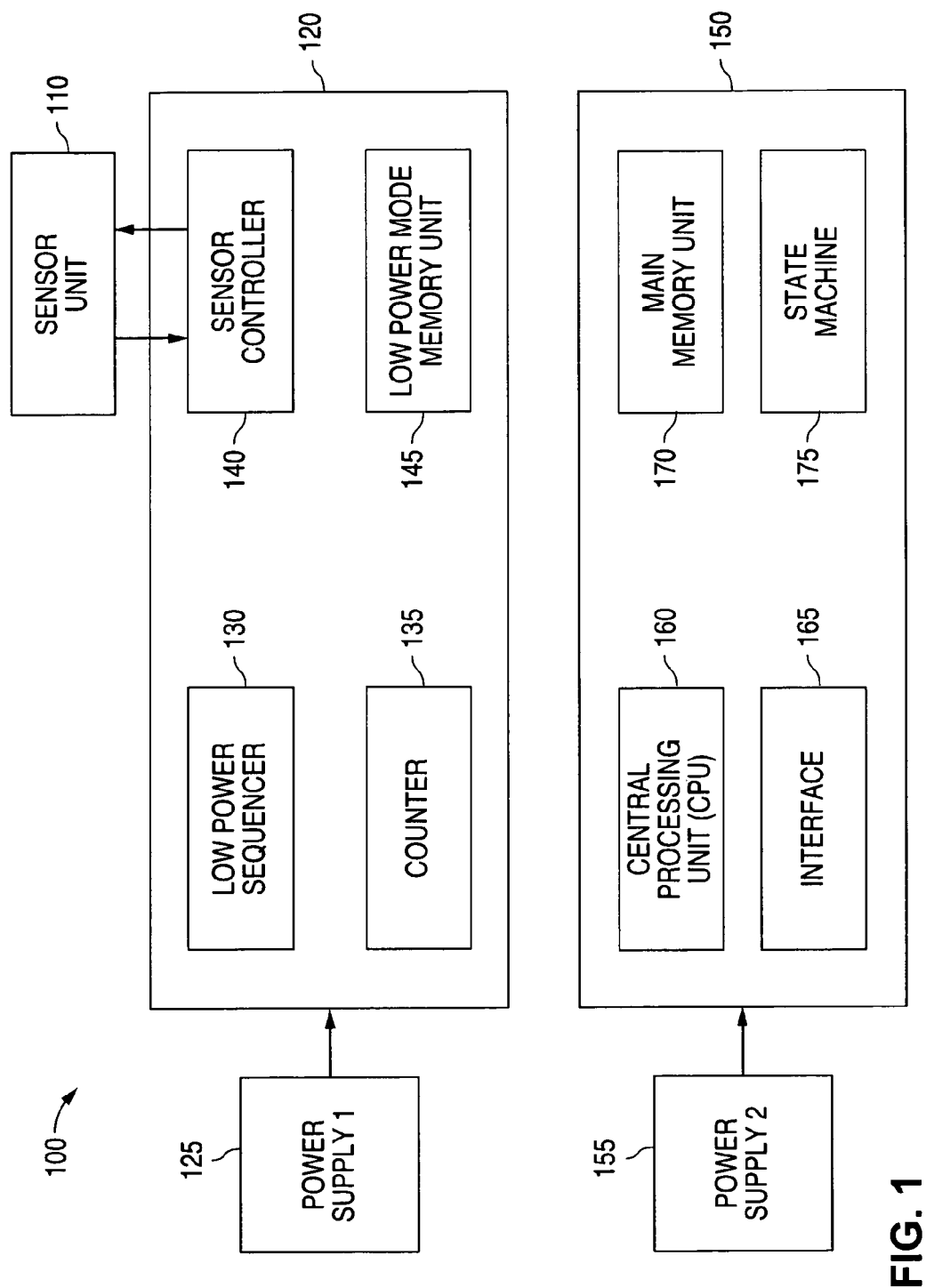
FIG. 1 illustrates a block diagram of an advantageous embodiment of a circuit of the present invention for minimizing power consumption for an object sensor.
Figure 2:
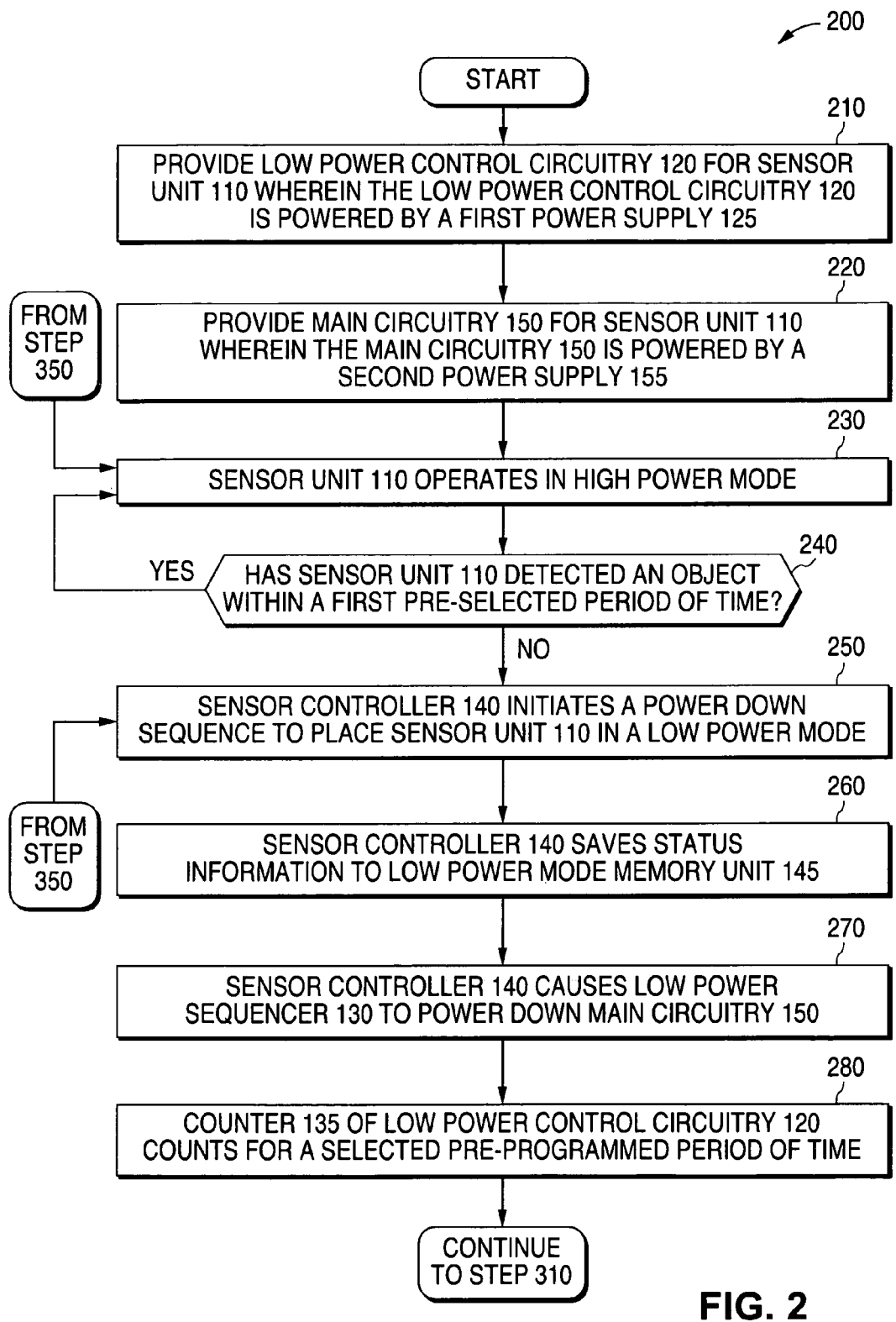
FIG. 2 illustrates a first portion of a flow chart of an advantageous embodiment of the method of the present invention.
Figure 3:
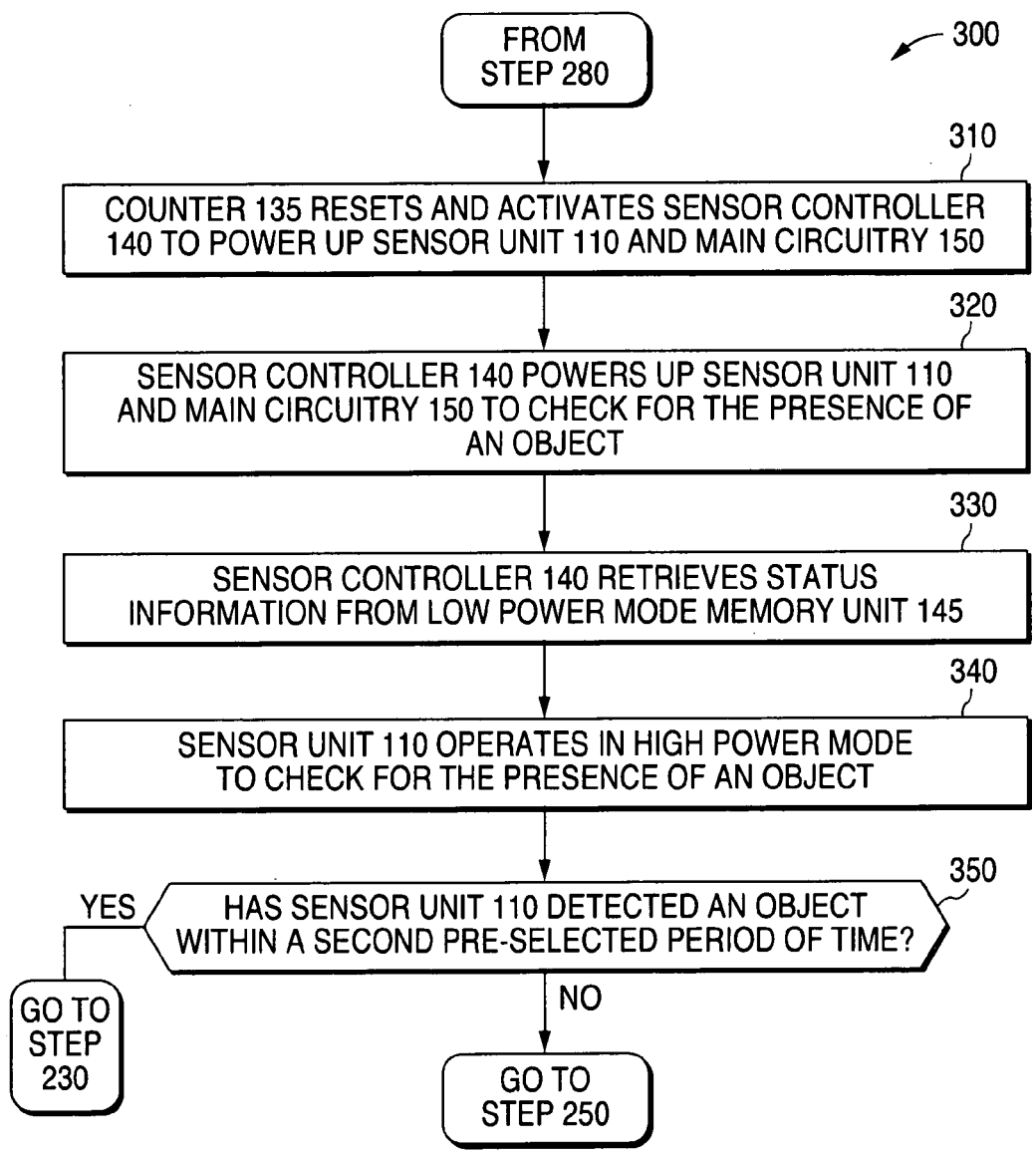
FIG. 3 illustrates a second portion of a flow chart of an advantageous embodiment of the method of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged object sensor control circuitry.

FIG. 1 illustrates a block diagram 100 of an advantageous embodiment of a circuit of the present invention for providing low power consumption for an object sensor. The object sensor is designated with reference numeral 110. In one advantageous embodiment of the invention, the object sensor 110 is capable of detecting the presence of a finger for the purpose of recording fingerprint information from the finger.

As shown in FIG. 1, the present invention comprises low power control circuitry 120 and main circuitry 150 for operating the sensor unit 110. Low power control circuitry 120 comprises a low power sequencer unit 130, a counter 135, a sensor controller 140, and a low power mode memory unit 145. Main circuitry 150 comprises a central processing unit (CPU) 160, an interface 165, a main memory unit 170, and a state machine 175.

The sensor controller 140 of low power control circuitry 120 has an output coupled to an input of the sensor unit 110, and an input coupled to an output of the sensor unit 110. The sensor controller 140 receives information signals from the sensor unit 110. The sensor controller 140 also sends control signals to the sensor unit 110 that control the operation of the sensor unit 110.

Low power control circuitry 120 is coupled to and is powered by a first power supply 125 (shown as Power Supply 1 in FIG. 1). Main circuitry 150 is coupled to and is powered by a second power supply 155 (shown as Power Supply 2 in FIG. 1). The first power supply 125 provides power only for the low power control circuitry 120. The second power supply 155 provides power only for the main circuitry 150. Therefore, the first power supply 125 is sometimes referred to as a "low power" power supply. The words "low power" refer to the fact that the first power supply 125 is providing power only to the circuit elements that remain operational during the "low power" mode of operation.

The sensor unit 110 is required to remain operational during the time that the sensor unit 110 is waiting to receive an object to sense (e.g., a finger). Because the sensor unit may be used in battery operated systems for extended periods of time, it is necessary that the power consumption be minimized. The present invention provides an advantageous system and method for minimizing the power consumption of the sensor unit 110.

The present invention places most of the circuitry that is necessary to operate the sensor unit 110 (i.e., main circuitry 150) on a voltage supply plane that is coupled to the second power supply 155. The low power control circuitry 120 is placed on a voltage supply plane that is coupled to the "low power" first power supply 125. The low power control circuitry 120 places the sensor unit 110 into a "low power" mode of operation when no object is present for the sensor unit 110 to detect. When an object is present for the sensor unit 110 to detect, the low power control circuitry 120 removes the sensor unit 110 from the "low power" mode of operation and places it in a normal "high power" mode of operation. The sensor unit 110 then performs its normal operation and detects the presence of the object (e.g., finger) and obtains information from the object (e.g., fingerprint information from the finger).

Whenever the low power control circuitry 120 determines that a pre-selected period of time has elapsed during which no object is present for detection by sensor unit 110, then low power control circuit 120 removes the sensor unit 110 from the "high power" mode of operation and returns the sensor unit 110 to a "low power" mode of operation. The low power control circuitry minimizes power consumption of the sensor unit 110 by only operating in a "high power" mode of operation when an object is present for the sensor unit 110 to detect.

The low power control circuitry 120 always remains in an operational state. That is, the first power supply 125 continually provides power to the low power control circuitry 120. In contrast, the main circuitry 150 is sometimes operational (during the "high power" mode of operation) and is sometimes not operational (during the "low power" mode of operation). The low power control circuitry 120 places the main circuitry 150 a "low power" mode of operation by disabling the power from the second power supply 155.

In addition to reducing the power consumption, turning off power to the main circuitry 150 (and associated input/output circuitry) eliminates leakage issues that are related to process. The circuit elements of the main circuitry (and associated input/output circuitry) are the main sources of idle and leakage currents in prior art devices. The circuitry of the present invention has a very stable leakage across all process corners, matching library models.

FIG. 2 illustrates a first portion 200 of a flow chart of an advantageous method of the present invention. In the first step of the method low power control circuitry 120 is provided for sensor unit 110 (step 210). The low power control circuitry 120 is powered by a first power supply 125. The main circuitry 150 for sensor unit 110 is also provided (step 220). The main circuitry 150 is powered by a second power supply 155. Although shown sequentially in FIG. 2, the two steps 210 and 220 occur simultaneously.

Sensor unit 110 is then operated in "high power" mode (step 230). Low power control circuitry 140 then determines whether sensor unit 110 has detected an object within a first pre-selected period of time (decision step 240). If the sensor unit 110 has detected an object, then the YES branch is taken and control returns to step 230. In this case, the sensor unit 110 continues to operate in the "high power" mode.

If the sensor unit 110 does not detect an object with the first pre-selected period of time, then the NO branch is taken and control passes to step 250. Then the sensor controller 140 of the low power control circuitry 120 initiates a "power down" sequence to place sensor unit in a "low power" mode (step 250). Then sensor controller 140 saves the status information from sensor unit 110 to low power memory unit 145 (step 260). Sensor controller 140 then causes low power sequencer 130 to power down the main circuitry 150 (step 270).

After the main circuitry 150 has been powered down, the counter 135 of low power control circuitry 120 begins to count for a selected pre-programmed period of time (step 280). Control then passes to step 310 in FIG. 3.

FIG. 3 illustrates a second portion 330 of a flow chart of an advantageous method of the present invention. Control passes to step 310 from step 280 of FIG. 2. After counter 135 reaches the selected pre-programmed period of time, then counter 135 resets and activates sensor controller 140 to power up the sensor unit 110 and the main circuitry 150 (step 310). Then sensor controller 140 powers up the sensor unit 110 and the main circuitry 150 to check for the presence of an object at the sensor unit 110 (step 320).

The sensor controller 140 retrieves the status information for the sensor unit 110 from the low power mode memory unit 145 (step 330). Then the sensor unit 110 operates in "high power" mode to check for the presence of an object at the sensor unit (step 340).

Then the sensor controller 140 determines whether the sensor unit 110 has detected an object within a second pre-selected period of time (decision step 350). If the sensor unit 110 has detected an object within the second pre-selected period of time, then the YES branch is taken and control passes to step 230 of FIG. 2. In this case, the sensor unit 110 continues to operate in a "high power" mode (step 230).

If the sensor unit 110 has not detected an object within the second pre-selected period of time, then the NO branch is taken and control passes to step 250 of FIG. 2. In this case, the sensor unit 110 removed from the "high power" mode of operation and is again placed in the "low power" mode of operation (step 250).

In this manner the low power control circuitry 120 of the present invention minimizes the power consumption required for the operation of sensor unit 110.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should realize that such equivalent constructions do not depart from the spirit and scope of the invention in its broadest form.

For example, an advantageous embodiment of the system and method of the present invention was described for a sensor unit that is capable of detecting a finger for a fingerprint sensor. It is understood that the principles of the present invention are not limited to this application and that other applications of the method of the present invention for minimizing power consumption may be used in other types of electronic devices (e.g., cellular telephones).

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus for reducing or minimizing power consumption of a sensor unit that is configured to detect and scan an object only when the sensor unit is operating in a high power mode of operation, the apparatus comprising:

main circuitry having a main power supply, wherein the main circuitry operates the sensor unit in the high power mode of operation; and low power control circuitry having a second power supply, wherein the low power control circuitry operates the sensor unit in a low power mode of operation when the sensor unit does not detect the object within a specified period of time.

2. The apparatus as set forth in claim 1, wherein the main circuitry operates the sensor unit in the high power mode of operation when the sensor unit detects the object.

3. The apparatus as set forth in claim 1, wherein the low power control circuitry comprises a counter configured to count for the specified period of time.

4. The apparatus as set forth in claim 1, wherein the second power supply continually supplies power to the low power control circuitry.

5. An apparatus for reducing or minimizing power consumption of a sensor unit that is capable of detecting and scanning an object only when the sensor unit is operating in a high power mode of operation, the apparatus comprising:
- main circuitry that operates the sensor unit in the high power mode of operation;
- low power control circuitry that operates the sensor unit in a low power mode of operation;
- a first power supply coupled to the low power control circuitry that continually supplies power to the low power control circuitry;
- a second power supply coupled to the main circuitry that supplies power to the main circuitry only when the main circuitry is operating the sensor unit in the high power mode of operation; and
- a sensor controller that places the sensor unit in the low power mode of operation when the sensor unit does not detect the object within a specified period of time.

6. The apparatus as set forth in claim 5, wherein the low power control circuitry comprises: a counter configured to count for the specified period of time.

7. The apparatus as set forth in claim 6, wherein the low power control circuitry further comprises: a low power mode memory unit in which the sensor controller stores status information from the sensor unit when the sensor controller places the sensor unit in the low power mode of operation.

8. The apparatus as set forth in claim 6, wherein the low power control circuitry further comprises: a low power sequencer that powers down the main circuitry when the sensor controller places the sensor unit in the low power mode of operation.

9. An apparatus for reducing or minimizing power consumption of a sensor unit that is capable of detecting and scanning an object only when the sensor unit is operating in a high power mode of operation, the apparatus comprising:
- main circuitry that operates the sensor unit in the high power mode of operation; and
- low power control circuitry that operates the sensor unit in a low power mode of operation, wherein the low power control circuitry includes:
  - a sensor controller that places the sensor unit in the low power mode of operation when the sensor unit does not detect the object within a first specified period of time; and
  - a low power sequencer that powers down the main circuitry when the sensor controller places the sensor unit in the low power mode of operation;
  - wherein the low power sequencer powers down the main circuitry by disabling a power supply that supplies power to the main circuitry.

10. The apparatus as set forth in claim 9, wherein the low power control circuitry further comprises: a counter that counts for a second specified period of time to determine when to activate the sensor controller to power up the sensor unit and the main circuitry after the sensor unit has been placed in the low power mode of operation.

11. An apparatus for reducing or minimizing power consumption of a fingerprint sensor unit that is capable of detecting and scanning a finger, the apparatus comprising:
- a fingerprint sensor unit that detects and scans the finger only when the sensor unit is operating in a high power mode of operation;
- main circuitry having a main power supply, wherein the main circuitry operates the fingerprint sensor unit in the high power mode of operation when the fingerprint sensor unit detects the finger; and
- low power control circuitry having a second power supply, wherein the low power control circuitry operates the fingerprint sensor unit in a low power mode of operation when the fingerprint sensor unit does not detect the finger within a specified period of time.

12. The apparatus as set forth in claim 11, wherein the low power control circuitry comprises:
- a sensor controller;
- a low power sequencer;
- a low power mode memory unit; and
- a counter.

13. A method for reducing or minimizing power consumption of a sensor unit that is capable of detecting and scanning an object, the method comprising the steps of:
- detecting and scanning the object using the sensor unit only when the sensor unit is operating in a high power mode of operation;
- operating main circuitry powered by a main power supply to operate the sensor unit in the high power mode of operation when the sensor unit detects the object; and
- operating low power control circuitry powered by a second power supply to operate the sensor unit in a low power mode of operation when the sensor unit does not detect the object within a specified period of time.

14. The method as set forth in claim 13 further comprising the step of: continually supplying power to the low power control circuitry with the second power supply.

15. A method for reducing or minimizing power consumption of a sensor unit that is capable of detecting and scanning an object, the method comprising the steps of:
- operating main circuitry to operate the sensor unit in a high power mode of operation when the sensor unit detects and scans the object only in the high power mode of operation;
- operating low power control circuitry to operate the sensor unit in a low power mode of operation when the sensor unit does not detect the object within a specified period of time;
- continually supplying power to the low power control circuitry from a first power supply coupled to the low power control circuitry; and
- supplying power to the main circuitry from a second power supply coupled to the main circuitry only when the main circuitry is operating in the high power mode of operation.

16. The method as set forth in claim 15, further comprising the step of:
- operating a sensor controller within the low power control circuitry to place the sensor unit in the low power mode of operation when the sensor unit does not detect the object within the specified period of time.

17. The method as set forth in claim 16, further comprising the step of:
- operating the sensor controller to store status information from the sensor unit in a low power mode memory unit when the sensor controller places the sensor unit in the low power mode of operation.

18. The method as set forth in claim 16, further comprising the step of:

powering down the main circuitry with a low power sequencer when the sensor controller places the sensor unit in the low power mode of operation.

19. The method as set forth in claim 18, wherein the step of powering down the main circuitry comprises: disabling the second power supply.

20. The method as set forth in claim 16, further comprising the steps of:

operating a counter to count for a second specified period of time to determine when to activate the sensor controller to power up the sensor unit and the main circuitry after the sensor unit has been placed in the low power mode of operation; and powering up the sensor unit and the main circuitry after the counter has counted for the second specified period of time.

\* \* \* \* \*